June 1, 1937.  C. I. HANEY  2,082,000
PROCESS FOR CONCENTRATING ALIPHATIC ACIDS
Filed Oct. 31, 1933  2 Sheets-Sheet 1

INVENTOR
CLIFFORD I. HANEY
BY
ATTORNEYS

June 1, 1937.　　　　　C. I. HANEY　　　　　2,082,000
PROCESS FOR CONCENTRATING ALIPHATIC ACIDS
Filed Oct. 31, 1933　　　2 Sheets-Sheet 2
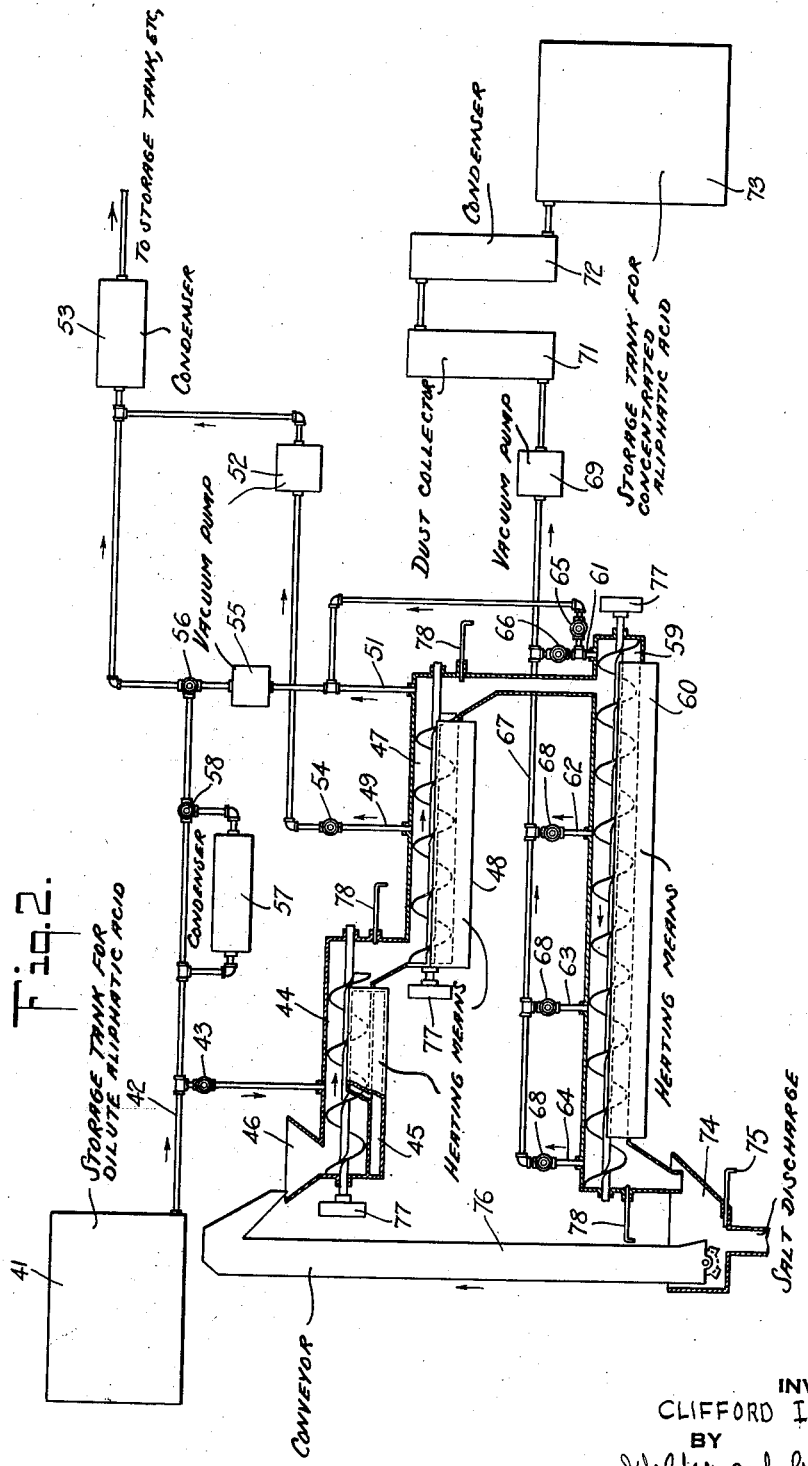
INVENTOR
CLIFFORD I HANEY
BY
ATTORNEYS Patented June 1, 1937

2,082,000

UNITED STATES PATENT OFFICE 2,082,000

PROCESS FOR CONCENTRATING ALIPHATIC ACIDS

Clifford I. Haney, Drummondville, Quebec, Canada, assignor to Celanese Corporation of America, a corporation of Delaware Application October 31, 1933, Serial No. 695,967

17 Claims. (Cl. 260—122)

This invention relates to the concentration of aliphatic acids from their dilute solution, particularly acetic acid and other dilute acids from the manufacture of cellulose esters, etc.

An object of the invention is the economical and expeditious concentration of aliphatic acids applicable to commercial scale operation.

Another object of the invention is the concentration of aliphatic acids by a dry process. Other objects of this invention will appear from the following detailed description and drawings.

In the drawings

Fig. 2 is a side elevation, partially in section and partially diagrammatic of a device for carrying out the invention by a continuous process.

Figure 1:
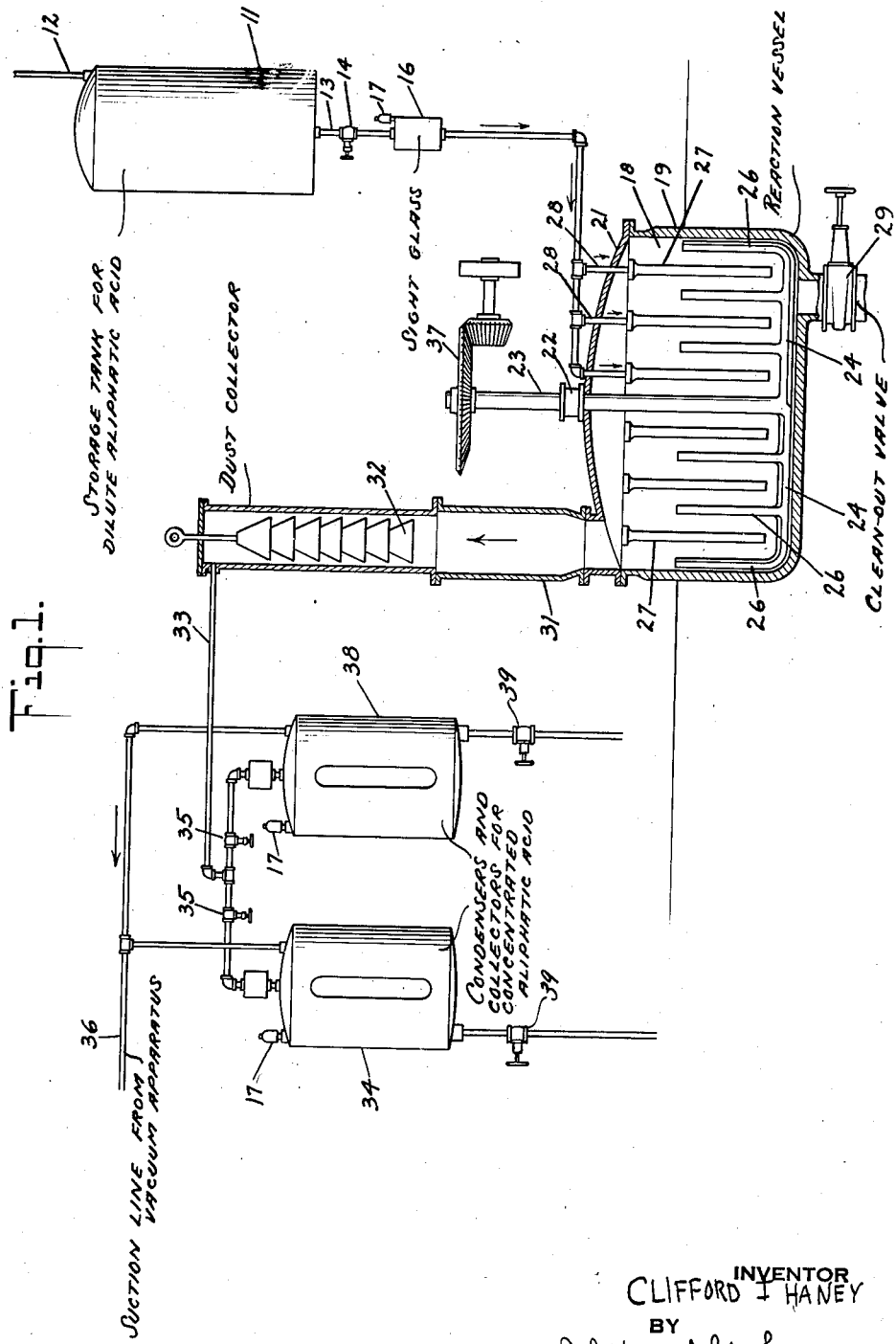
Fig. 1 is a side elevation partially in section of a device for carrying out the invention by the batch process.

The common laboratory method of producing concentrated aliphatic acids from their dilute solutions by mixing a solution of a neutral alkali salt of the acid to be concentrated with the dilute solution of the acid and precipitating an acid salt of the acid involves many inconveniences and expenses when applied to commercial production. For example, there is the water of the salt solution to be evaporated or otherwise removed and there is also the necessity of employing precipitating tanks, separators, washers, etc. I have found that aliphatic acids may be concentrated by a dry method thereby eliminating the necessity of evaporating the water or solvent of a salt solution, and also eliminating the necessity of precipitating tanks, separators, washers, etc. By this invention any mother liquor that is formed is removed and recovered practically as it is formed. Thus the process is further simplified in not having to treat and move through the various steps of the process a great bulk of material per unit of concentrated acid recovered.

By the employment of the method and/or devices of this invention, the concentrated acid may be produced with a greatly reduced temperature as compared with that employed in other processes of concentrating corresponding acids. By this invention there is also provided the possibility of adjustment of conditions so that acid salt crystals can be continuously grown to large practical crystals. The growth of acid salt crystals is also promoted by the presence of the neutral salt in a highly concentrated form.

By this invention there is no necessity for drying the acid salt crystals by hot air or other types of dryers as dry crystals are produced without the employment of hot air or extra handling.

By the process of this invention there is no necessity of separating by mechanical means or washings the double or acid salts from included neutral salts or mother liquors. The mother liquor is removed immediately upon formation and the neutral salts unaffected by the acid pass through the system and future steps without detriment to the final products and with practically no waste.

I have found that the concentration of aliphatic acids may be greatly simplified and superior products formed by mixing the dilute acid to be concentrated in the form of vapor or liquid, with a dry or substantially dry salt forming continuously acid salt crystals from the dilute acid and dry salt. I have also found that superior products are formed by removal of water at low temperatures by the use of vacuum.

In accordance with my invention, I produce concentrated aliphatic acids by mixing the dilute concentrated aliphatic acids, either in the liquid or vapor state, with dry or substantially dry salts of the aliphatic acid being treated or other suitable salts thereby forming acid salt crystals, heating the acid salt crystals to remove the water or solvent and any excess acid and then more strenuously heating the acid salt crystals to break down the crystal to a concentrated acid and a salt. The concentrated acid and salt are then separated by distillation. By substantially dry is meant that there be such a minute quantity of water and other liquids present that the mix remains powdery and non-pasty and that crystallization readily takes place.

This invention is applicable to the concentration of aliphatic acids in general. It is especially applicable, however, to the concentration of acetic acid from a diluted state such as the concentration of acetic acid from vinegar, spent acids from the manufacture of cellulose acetate or products thereof and from the acetic acid solutions formed by retort distillation of pyroligneous material.

Any neutral salt or mixture of neutral salts may be employed which are capable of forming with the acids to be concentrated double or acid salts. Thus the alkali metal salts and alkaline earth salts of the acid to be concentrated may be employed. Also mixtures of alkaline or alkaline earth salts may be employed. It is preferable, however, for commercial purposes to use either the sodium or potassium salts or mixture of these.

The temperatures employed will depend somewhat upon the strength and kind of dilute acid and also upon the amount of vacuum, the composition of the salt employed and the amount of agitation or stirring during concentration. In the concentration of acetic acid to 99% strength or above from a dilute solution of 30 to 40% strength, using sodium acetate salt, the various steps of the process operating under a vacuum of 25 or 26 inches and with thorough stirring the absorption step requires a temperature of about 60 to 70° C.; the water removal step about 90 to 100° C. and the decomposition step about 130 to 160° C. Under the same conditions, except employing a potassium acetate salt, the temperatures run between 20 and 30° C. higher for the most efficient recovery.

The use of vacuum is very beneficial to the formation of the crystals of the acid salts, as lower temperatures can thus be used to remove the freed water and crystallization takes place at lower concentration when lower temperatures are used. As an example, when concentrating acetic acid employing potassium acetate under vacuum of 25 to 26 inches, a maximum temperature of 140 to 160° C. is usually sufficient for promoting rapid crystal growth and efficient decomposition of the acid salt. When employing sodium acetate salt and a vacuum of 25 to 26 inches, the highest temperature necessary in the process is 130 to 160° C. with an efficient temperature of only 60° C. in the absorption step of the process.

The thorough stirring during absorption, removal of water by distillation adds to the efficiency of the process and aids in the same way as vacuum in permitting lower temperatures to be used. The thorough stirring also aids in preventing a heavy stage i. e. when the mass of water, acid and salt tends to cake or gum, and in preventing the formation of a hard scale. It is to be noted, however, that in the process of this invention by starting with the dry salt there is little tendency to form a heavy stage which feature is a benefit giving rise to lighter machinery and more uniform product and regulation of the various steps of the process.

In Fig. 1 of the drawings is disclosed a device for carrying out the process in single batches or non-continuously. There is provided a storage tank 11 having an inlet 12 and an outlet 13. The dilute acetic acid from a still or from a processing step in the manufacture of cellulose products, such as is produced by precipitating cellulose acetate by adding water to a solution of cellulose acetate formed in the acetylation of cellulose, is run into the tank 11 where it may be stored and the outflow controlled. The feed or quantity of dilute acid supplied to the concentrating process may be controlled by the valve 14 and watched through the sight-glass 16.

The dilute acid from tank 11 is fed into the stirring apparatus or reaction vessel 18 which is comprised of an outer shell 19 having a top 21 sealed to the shell. Through a suitable bearing and stuffing box 22 in the top of the shell is passed a shaft 23 having at its lower end a plurality of radially extending arms 24. Each of the radially extending arms have upright fingers 26 attached thereto so spaced that they may pass between a series of resistance arms 27 rigidly and stationarily held suspended from suitable supports at the top of the reaction vessel.

The resistance arms 27 are hollow or supplied with ducts opening into the reaction vessel near the bottom of the arms or along the arms. Within any suitable number of these resistance arms are feed lines 28 which are connected with the dilute acid tank 11 by means of headers and line 13.

At the bottom of the reaction vessel 18 is a clean out valve 29 for carrying off wash waters, spent salt, etc. From the top of the reaction vessel is a flue 31 sealed to the top of the vessel. In the flue 31 is dust separating means 32 of any commercial type for separating, from the vapor passing through the flue, the small particles of entrapped salts, etc. From the dust separating means there is an outlet line 33 for carrying off the vapor, said outlet line being connected to two condensers 34 and 38 and collecting vessels either or both of which may be used by the regulation of valves 35. For maintaining the complete system under vacuum there is a suction line 36 running to each of the collecting vessels. The vessels 34 and 38 are provided with outlet valves 39.

Throughout the system at desired points there may be applied safety devices 17 for controlling pressures above or below certain limits. The stirring apparatus may be propelled by means of gears 37 supplied with power from any suitable source.

Having described the device disclosed in Fig. 1 of the drawings, a description of its use in concentrating acetic acid will be described, however, not intending that the invention be limited thereto.

A quantity of dry sodium acetate is placed in or retained from a previous run in the reaction vessel and is warmed up to about 60° C. by steam pipes, not shown, attached to certain of the resistance arms 27 or by open flames, or a steam jacket about the outside of the reaction vessel or by any other heating expedient.

A quantity of a dilute acetic acid is admitted gradually to the reaction vessel through the openings in the resistance arms while thoroughly stirring the mixture. Upon signs of dampness the temperature of the reaction vessel is raised to 99° C. and the inflow of acid decreased and finally shut off when the volume of dilute acid added is about equal to the volume of dry sodium acetate. After the inflow of dilute acetic acid has been shut off the temperature is held at 99° C. for a few minutes. During this absorption and crystallization step the vapors which contain from 6 to 14% acetic acid are passed into collecting vessel 34 where they are condensed and collected, from which they may be pumped back to the storage tank 11 for uniformly diluting the incoming dilute acid or they may be otherwise disposed of in various processes, etc. not involved in the concentration process. During this step the neutral sodium acetate salt is converted and crystallized into an acid acetic acid salt. The product contains approximately acetic acid 36.2%, sodium acetate 62%, impurities such as sodium sulphate 1.36% and 0.44% water.

The temperature of the reaction vessel is now raised to about 140° C. at which temperature under the operating conditions present the double salts break down, liberating the concentrated acetic acid in vapor form which is carried through the dust collector to remove entrapped particles of sodium acetate and other dust particles and is condensed in the collecting vessel 38. The concentrated liquid acetic acid may be pumped from the collecting vessel to storage tanks or to processing devices.

It is preferable to maintain throughout the various steps a vacuum of about 25 or 26 inches and the mix well stirred.

In place of running the dilute acid into the reaction vessel as a liquid a vaporizing device may be inserted in the line 13 and the dilute acid supplied to the reaction vessel in the vapor state. The results are substantially the same. The working conditions differ only in that less heat is supplied directly to the reaction vessel as the incoming dilute acid vapor contains heat.

A device for carrying out this invention as a continuous process is disclosed in Fig. 2 of the drawings. As many of the elements such as pumps and condensers are standard stock elements they have not been shown in detail. In the drawings 41 is a storage tank for the dilute acid coming from a still or process step in the manufacture of such articles as those made from derivatives of cellulose. An outlet 42 controlled by valve 43 carries the dilute acid to a screw conveyor 44 having a heating element shown as a steam jacket 45. Other methods of heating may be employed such as open flames, electrical resistance coils, etc. The screw of the conveyor is preferably of a short pitch or has stirring rods inserted in the shaft or other expedients used so that there is a thorough stirring of the material conveyed. Opening into the conveyor 44 is a feed hopper 46 for supplying the solids to the conveyor.

The conveyor 44 discharges into a second screw conveyor 47 having a heating element 48 attached thereto. From the second conveyor there are two vapor outlets 49 and 51. The outlet 49 leads, controlled by valve 54, through a vacuum pump 52 and a condenser 53 where the vapors carried thereby are condensed. The liquid formed in the condenser may be pumped to storage tanks, etc. The outlet and line 51 carries the vapors through a vacuum pump 55 and a three-way control valve 56, which may direct the vapors to the condenser 53 and out of the system or direct the vapors back to the supply tank 41 directly or through condenser 57 by way of the three-way valve 58.

The conveyor 47 discharges into a third conveyor 59 having a heating element 60 attached thereto. Spaced along the length of the conveyor 59 are vapor outlets and lines 61, 62, 63 and 64 of which there may be any number thereof. At least one of these vapor outlets or lines, for example line 61, is adapted by means of valves 65 and 66 to either carry the vapor back to line 51 or to line and header 67. Each of the other outlets are preferably adapted to be controlled by valves 68. The header and line 67 carries the vapors taken off in the third conveyor through a vacuum pump 69, a dust collector 71, a condenser 72 from which the condensed vapor is carried to a storage tank 73 for future use.

The conveyor 59 discharges into a hopper 74. The material from the hopper 74 may be discharged by gate 75 to be used as desired or it may be conveyed back to hopper 46 by any type of conveyor 76. The conveyors may be propelled by any suitable means as belts on pulleys 77.

The conveyors are all so arranged either by a short pitch in the screws or by having stirring rods attached to their shafts so that the material conveyed is thoroughly stirred. The flow of material from one conveyor to the next may be controlled by gates 78. The vacuum pumps may be placed in the lines before or after the condensers and dust collector.

The invention is carried out in the device disclosed in Fig. 2 as hereafter described in reference to the concentration of acetic acid using sodium acetate salt. However, other acids may be concentrated thereby and other salts may be employed without departing from my invention. A neutral salt of sodium acetate is fed to conveyor 44 by means of the hopper 46. A volume of dilute acetic acid of 30 to 40% strength is supplied in the liquid or vapor state to the conveyor 44, the volume of which in the liquid state is slightly less than the volume of salt admitted to the conveyor by hopper 46. The conveyor 44 is maintained at a temperature of about 60° C. and the material slowly passed through while vigorously stirred.

The conveyor 44 discharges the mixture of acetic acid absorbed by the salt, water and unaffected materials into conveyor 47 which is maintained by element 48 at a temperature of about 95 to 100° C. The mix is crystallized in this conveyor, and the water and dilute acid which is present after the formation of the double salt is evaporated and carried off by either or both of the vapor lines 49 and 51. The vapor given off contains between 3 and 14% acetic acid in water or other solvent. When the vapor coming off is about 14% acetic acid it may be drawn off at the outlet 51 by means of the vacuum pump, sent through the condenser 57 and/or line 42 to the dilute charging stock for the purpose of regulating its concentration. If the vapor produced in conveyor 47 is about 3% acetic acid, it may be removed entirely from the system by passing through condenser 53. Also the vapors from the entrance end of the conveyor may be discharged from the system while the vapors from the exit end of the conveyor may run back to the storage tank 41.

The dry crystals of the acid salt are discharged from the conveyor 47 through the regulating gate 78 into conveyor 59 which conveyor is maintained at a temperature of about 150° C. In this conveyor the acid salt breaks down into concentrated acetic acid and a sodium acetate salt. The vapors of acetic acid are carried off by any or all the outlet lines 61, 62, 63 and 64 through a vacuum pump 69, a dust collector 71 for removing entrapped particles or the sodium salt and other dust particles and then through a condenser 72 to a storage tank 73. If the acid salt enters conveyor 59 before all the mother liquor is removed the vapors from the entrance end of the conveyor which will be relatively high in acetic acid content yet containing more than 1% solvent may be sent back by means of valves 65 and 66 to the storage tank 41.

The practically pure sodium acetate discharged from conveyor 59 may be conveyed back to hopper 46 to be rerun through the system. The hopper 46 is provided with a suitable valve such as a bell-valve for charging the material while at the same time allowing for the maintenance of a vacuum throughout the system of from 25 to 26 inches.

The continuous system may be satisfactorily employed because of the low temperatures necessary, the absence of a heavy end just prior to the commencement of the breaking down of the acid salt crystals and also the absence of scale formation normally formed in the liquid processes.

The temperatures and time elements will vary with each acid and salt employed which may be easily ascertained by the operator. Such figures as given apply to acetic acid concentration with sodium acetate unless otherwise specified. For the concentration of acetic acid with potassium acetate the temperatures employed are from 20 to 30° C. higher.

It is to be understood that the foregoing detailed description and drawings are given by way of illustration and many alterations may be made therein without departing from the spirit of my invention.

Having described my invention what I desire to secure by Letters Patent is:

1. Process for the concentration of dilute aliphatic acids, which comprises bringing dilute aliphatic acid into contact with a substantially dry salt capable of forming a double salt with the aliphatic acid, maintaining the double salt in a substantially dry state, and decomposing the substantially dry double salt to produce concentrated aliphatic acid.

2. Process for forming concentrated aliphatic acid from aqueous solutions thereof, which comprises bringing the aqueous solution of an aliphatic acid into contact with a substantially dry salt capable of forming a double salt with the aliphatic acid, maintaining the double salt in a substantially dry state by removal of water in vapor form, and decomposing the double salt to produce concentrated aliphatic acid.

3. Process for the concentration of dilute aliphatic acids, which comprises vaporizing a dilute aliphatic acid, bringing the vapor so produced into contact with a substantially dry salt capable of forming a double salt with the aliphatic acid, maintaining the double salt in a substantially dry state, and decomposing the double salt to produce concentrated aliphatic acid.

4. Process for forming concentrated aliphatic acid from aqueous solutions thereof, which comprises bringing the aqueous solution of an aliphatic acid into contact with a substantially dry salt capable of forming a double salt with the aliphatic acid, by stirring said solution and said salt together, maintaining the double salt in a substantially dry state by removal of water in vapor form, and decomposing the double salt to produce concentrated aliphatic acid.

5. Process for the concentration of dilute aliphatic acids, which comprises vaporizing a dilute aliphatic acid, bringing the vapor so produced into contact with a substantially dry salt capable of forming a double salt with the aliphatic acid, by agitating said salt in the presence of said vapor, maintaining the double salt in a substantially dry state, and decomposing the double salt to produce concentrated aliphatic acid.

6. Process for the concentration of dilute aliphatic acids, which comprises vaporizing a dilute aliphatic acid, bringing the vapor so produced into contact with a substantially dry salt capable of forming a double salt with the aliphatic acid, maintaining the double salt in a substantially dry state, by removal of the diluent in vapor form, and decomposing the double salt to produce concentrated aliphatic acid.

7. Process for the concentration of dilute aliphatic acids, which comprises mixing under reduced pressure dilute aliphatic acid with a substantially dry salt capable of forming a double salt with the aliphatic acid, maintaining the double salt in a substantially dry state and decomposing the substantially dry double salt to produce concentrated aliphatic acid.

8. Process for the concentration of dilute aliphatic acids, which comprises vaporizing a dilute aliphatic acid, mixing under reduced pressure the vapor so produced with a substantially dry salt capable of forming a double salt with the aliphatic acid, maintaining the double salt in a substantially dry state, and decomposing the double salt to produce concentrated aliphatic acid.

9. Process for forming concentrated aliphatic acid from aqueous solutions thereof, which comprises mixing under reduced pressure the aqueous solution of an aliphatic acid with a substantially dry salt capable of forming a double salt with the aliphatic acid, maintaining the double salt in a substantially dry state by removal of water in vapor form, and decomposing the double salt to produce concentrated aliphatic acid.

10. Process for the concentration of dilute aliphatic acids, which comprises vaporizing a dilute aliphatic acid, mixing under reduced pressure the vapor so produced with a substantially dry salt capable of forming a double salt with the aliphatic acid, maintaining the double salt in a substantially dry state by removal of the diluent in vapor form, and decomposing the double salt to produce concentrated aliphatic acid.

11. Process for the concentration of dilute acetic acid, which comprises bringing dilute acetic acid into contact with a substantially dry salt capable of forming a double salt with the acetic acid, maintaining the double salt in a substantially dry state by the application of heat, and then decomposing the double salt by further application of heat to produce concentrated acetic acid.

12. Process for forming concentrated acetic acid from aqueous solutions thereof, which comprises bringing the aqueous solution of acetic acid into contact with a substantially dry salt capable of forming a double salt with the acetic acid, maintaining the double salt in a substantially dry state by removal of water in vapor form by the application of heat, and decomposing the double salt by the further application of heat to produce concentrated acetic acid.

13. Process for the concentration of dilute acetic acid, which comprises vaporizing the dilute acetic acid, bringing the vapor so produced into contact with a substantially dry salt capable of forming a double salt with the acetic acid, maintaining the double salt in a substantially dry state by removal of the diluent by the application of heat, and decomposing the double salt by the further application of heat to produce concentrated acetic acid.

14. Process for forming concentrated acetic acid from aqueous solutions thereof, which comprises bringing the aqueous solution of acetic acid into contact with a substantially dry alkali-metal acetate to form the double salt of acetic acid and alkali-metal acetate, maintaining said double salt in a substantially dry state by removal of water in vapor form by the application of heat, and decomposing the double salt to concentrated acetic acid and alkali-metal salt by further application of heat.

15. Process for the concentration of dilute acetic acid, which comprises vaporizing the dilute acetic acid, bringing the vapor so produced into contact with a substantially dry alkali-metal acetate to form the double salt of acetic acid and alkali-metal acetate, maintaining said double salt in a substantially dry state by removal of the diluent in vapor form by the application of heat, and decomposing the double salt to concentrated acetic acid and alkali-metal salt by further application of heat.

16. Process for forming concentrated acetic acid from aqueous solutions thereof, which comprises mixing under reduced pressure the aqueous solution of acetic acid with a substantially dry alkali-metal acetate to form the double salt of acetic acid and alkali-metal acetate, maintaining said double salt in a substantially dry state by removal of water in vapor form by the application of heat, and decomposing the double salt to concentrated acetic acid and alkali-metal salt by further application of heat.

17. Process for the concentration of dilute acetic acid, which comprises vaporizing the dilute acetic acid, mixing under reduced pressure the vapor so produced with a substantially dry alkali-metal acetate to form the double salt of acetic acid and alkali-metal acetate, maintaining said double salt in a substantially dry state by removal of the diluent in vapor form by the application of heat, and decomposing the double salt to concentrated acetic acid and alkali-metal salt by further application of heat.

CLIFFORD I. HANEY.